United States Patent [19]

Doren

[11] 4,380,192
[45] Apr. 19, 1983

[54] HOT DOG BROILER AND METHOD FOR MAKING SAME

[75] Inventor: Mark N. Doren, Grand Rapids, Mich.

[73] Assignee: Markson Manufacturing Company, Grand Rapids, Mich.

[21] Appl. No.: 292,740

[22] Filed: Aug. 14, 1981

[51] Int. Cl.³ ............................................ A47J 43/18
[52] U.S. Cl. ..................................... 99/441; D7/103; 99/448; 99/450; 140/71 R
[58] Field of Search ............... 140/71 R; 99/441, 448, 99/450, 426; D7/95, 99

[56] References Cited

U.S. PATENT DOCUMENTS

| | | |
|---|---|---|
| D 231891 | 6/1974 | Di Pirro . |
| 1,665,988 | 4/1928 | Smith . |
| 1,787,469 | 1/1931 | Blier . |
| 1,870,735 | 8/1932 | Jones et al. . |
| 1,945,165 | 1/1934 | Smith . |
| 2,136,658 | 11/1938 | Westberg et al. . |
| 2,189,047 | 2/1940 | Tolen . |
| 2,310,349 | 2/1943 | Bobo . |
| 2,479,533 | 8/1949 | Woodbury . |
| 2,594,500 | 4/1952 | Runnoe . |
| 2,804,819 | 9/1957 | Whealton . |
| 2,820,290 | 1/1958 | Porter, Jr. . |
| 3,931,758 | 1/1976 | Blake . |

Primary Examiner—Billy J. Wilhite
Attorney, Agent, or Firm—Price, Heneveld, Huizenga & Cooper

[57] ABSTRACT

A device for broiling elongate food articles, such as hot dogs, sausages, etc., comprises a rod having a handle at one end, and food retaining baskets connected with the other end of the rod. The baskets are detachably connected with the rod by support wires which extend laterally from both the open and closed ends of the baskets, and have bent over free ends which form eyelets through which the rod is closely received. The rod end opposite the handle is threaded. The support wires at the open ends of the baskets are threaded over the threaded area of the rod, onto a lower portion thereof, to non-fixedly mount the upper ends of the baskets. The support wires at the closed ends of the baskets are disposed on the threaded area of the rod, and a pair of threaded nuts are positioned on opposite sides of the support ends, and are tightened against each other to fixedly, yet detachably, mount the lower ends of the baskets on the rod in a predetermined configuration.

9 Claims, 5 Drawing Figures

U.S. Patent     Apr. 19, 1983     4,380,192
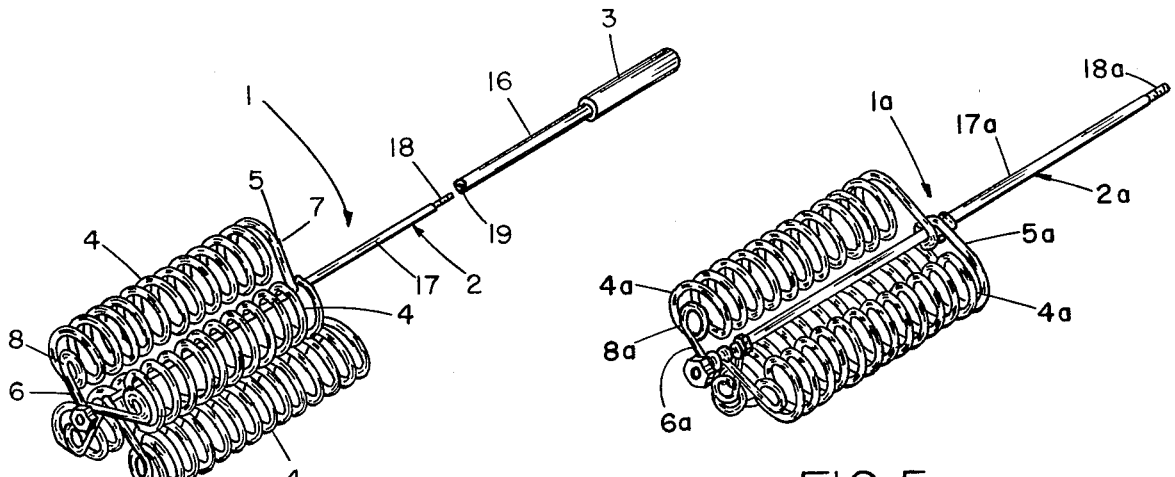
FIG 1
FIG 5
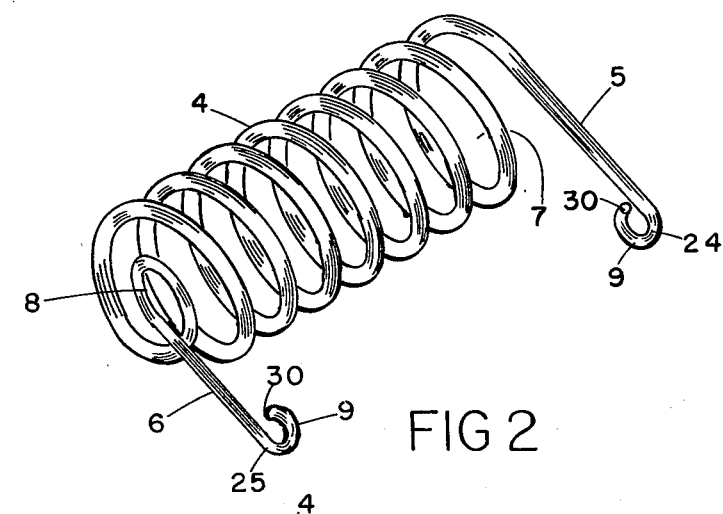
FIG 2
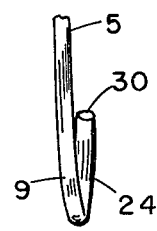
FIG 4
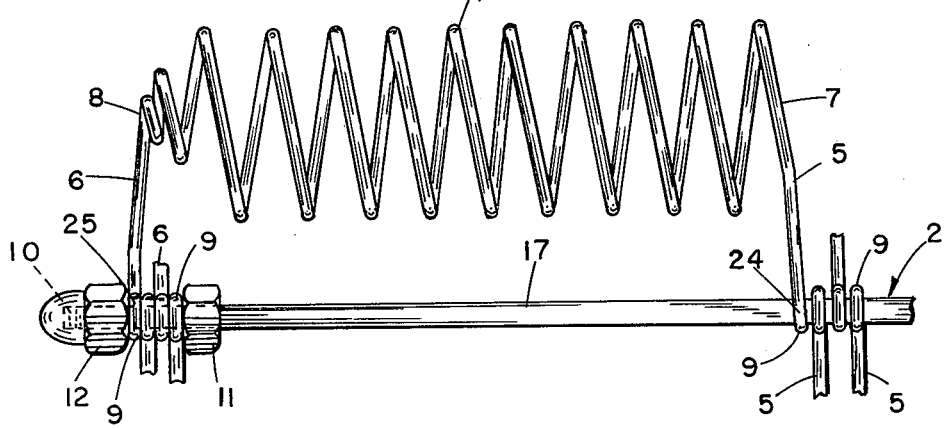
FIG 3

HOT DOG BROILER AND METHOD FOR MAKING SAME

BACKGROUND OF THE INVENTION

The present invention relates to a device for broiling hot dogs and the like over an open fire, and in particular to an arrangement for detachably mounting food retaining baskets to a rod portion of the broiler.

Cookers have been developed for broiling or roasting certain types of elongate food articles, such as hot dogs, sausage, weiners, ears of corn, and the like. Manually operated cookers are generally used for broiling such food articles over an open fire, and are typically used for camping, picnics, and other similar occasions.

Some types of broilers, such as those disclosed in U.S. Pat. Nos. 2,804,819 and 2,136,658, comprise an elongate rod, having a handle at one end, and one or more food retaining baskets attached to the opposite end of the rod. Heretofore, the baskets have been permanently and rigidly attached to the rod by welds or other similar connecting means. This type of attachment arrangement is rather expensive to manufacture, and cannot be easily repaired.

One aspect of the present invention is to provide a hot dog broiler, having means for detachably connecting food retaining baskets with an associated end of a support rod. The attachment arrangement comprises providing laterally extending support wires at both ends of each basket, and bending the free ends of each support wire into an eyelet, shaped to closely receive the rod therethrough. The rod end opposite the handle is threaded, and adapted to receive a pair of nuts thereon. The eyelets at the open ends of the baskets are threaded onto the rod over the threaded end thereof. A first nut is secured to the threaded end of the rod, and the eyelets at the closed ends of the baskets are then positioned over the threaded end of the rod. A second nut is then attached to the terminal end of the rod and tightened against the first nut, so that the eyelets are securely locked in place against each other in a sandwiched fashion between the nuts, thereby detachably connecting the baskets with the rod.

The principal objects of the present invention are to provide a basket attachment arrangement which reduces assembly time, difficulty and cost. The broiler design is modular, so that the same component parts can be used to construct broilers having one, two, three, four, or more baskets. The basket attachment arrangement is quite uncomplicated, does not require any special tools, and is designed so that bent or damaged baskets can be easily replaced by the user. The open ends of the baskets are not rigidly attached to the support rod, so that when struck, the baskets will vibrate vigorously to remove encrusted material, and other foreign substances from the baskets. The broiler is economical to manufacture, capable of a long operating life, and particularly well adapted for the proposed use.

These and other features, advantages, and objects of the present invention will be further understood and appreciated by those skilled in the art by reference to the following written specification, claims, and appended drawings.

BRIEF DESCRIPTION OF THE DRAWINGS

FIG. 1 is a partially schematic, perspective view of a hot dog broiler embodying the present invention, with a handle portion thereof shown in a disassembled condition.

FIG. 2 is a perspective view of a food retaining basket portion of the broiler.

FIG. 3 is a fragmentary, side elevational view of the broiler, particularly showing an arrangement for attaching the baskets to a rod portion of the broiler.

FIG. 4 is an enlarged, fragmentary elevational view of an end portion of a basket support wire.

FIG. 5 is a partially schematic, perspective view of another embodiment of the present invention, having three food retaining baskets.

DETAILED DESCRIPTION OF THE PREFERRED EMBODIMENTS

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, and step sequences, except where expressly specified to the contrary.

The reference numeral 1 (FIG. 1) generally designates a device embodying the present invention for broiling or roasting elongate food articles, such as hot dogs, sausages, weiners, ears of corn, and the like over an open fire for camping, picnics, and other similar occasions. Broiler 1 comprises a rigid support rod 2 having a grip or handle 3 attached to one end, and food retaining cages or baskets 4 connected with the opposite end of rod 2. Each basket 4 is detachably connected with rod 2 by two support wires 5 and 6, which extend laterally from the open end 7 and closed end 8 respectively of basket 4. Support wires 5 and 6 have free ends which are reverse bent to form eyelets 9 (FIG. 2) through which rod 2 is closely received. The rod end 10 (FIG. 3) opposite handle 3 is threaded, and adapted to receive mating nuts 11 and 12 thereof, which interconnect baskets 4 with rod 2, and retain the baskets in a selected spaced apart configuration.

The illustrated rod 2 (FIG. 1) has a segmented, two-part construction, comprising an upper section 16 to which handle 3 is attached, and a lower section 17 to which baskets 4 are connected. The upper end 18 of rod section 17 is threaded, and matingly received in a tapped aperture 19 in the lower end of upper section 16. This arrangement permits rod 2 to be collapsed for convenient storage and transport. In this example, upper rod segment 16 comprises a hollow aluminum tube, having an outside diameter sufficiently large to mount handle 3 thereon with a comfortably sized grip, yet sufficiently lightweight to prevent undue strain during use. A threaded sleeve (not shown) is fixedly mounted in the lower end of tube 16 to receive the threaded end 18 of rod segment 17 therein. The lower rod segment 17 comprises a solid rod, which preferably has a smooth, heat resistant surface which is corrosion resistant, and prevents adhesion of foreign substances. In this example, rod segment 17 is nickel plated. The free end 10 of rod segment 17 is threaded a distance which is sufficient to permit nuts 11 and 12 to capture at least four basket support ends therebetween, as shown in FIG. 3. In this manner, rod segment 17 can be used to manufacture two, three, and four basket embodiments of the broiler.

As best illustrated in FIGS. 2 and 3, baskets 6 comprise a helical coil, with a closed, lower end 8, and an open, upper end 7, through which hot dogs and the like are inserted into baskets 6. Each basket 6 includes two laterally extending support members 5 and 6, located at the open end 7 and the closed end 8 respectively of the basket to mount the baskets to rod 2. The free ends 24 and 25 of supports 5 and 6 are reverse bent into a loop or curl to form eyelets 9, having an inside diameter which is sized to closely receive rod 2 therethrough. Eyelets 9 are dimensioned with an inside diameter which provides tolerance when received over rod 2 for purposes to be described in greater detail hereinafter. The eyelets 9 on the two ends 24 and 25 of each basket 6 are located so that they assume a coaxial relationship, with the common axis being oriented substantially parallel with the central axis of basket 4. In this example, basket supports 5 and 6 are formed integrally with the basket from spring wire, so that the baskets have the characteristics of a helical spring, and are nickel plated. Also, all of the baskets 6 have an identical shape, and are therefore interchangeable to provide a very efficient modular construction.

The basket supports 25 at the closed ends of baskets 4 are preferably bent into a helical configuration at their free end, as best illustrated in FIG. 4, and have a sharp terminal edge 30, whereby the free ends of supports 25 are self-locking, in the nature of a lock washer, when sandwiched together between nuts 10 and 11, as shown in FIG. 3. The illustrated baskets 6 have both supports 24 and 25 formed helically, with the lateral offset, for easy and efficiency of manufacture.

The reference numeral 1a (FIG. 5) generally designates another embodiment of the present invention, having the same basket attachment arrangement described hereinabove. Since broiler 1a is similar to the previously described broiler 1, similar parts appearing in FIGS. 1-4 and 5 respectively are represented by the same, corresponding reference numeral, except for the suffix "a" in the numerals of the latter. Broiler 1a has three baskets 4a attached to rod 2a, which are arranged in a triangular configuration, instead of the four basket embodiment illustrated in FIG. 1. Broiler 1a is otherwise identical with the previously described four-basket embodiment 1, and lower rod segment 17a can be threadedly attached to the handle rod segment 16 (FIG. 1).

Broilers 1 and 1a are constructed in the following manner. A predetermined number of baskets 4 are selected in accordance with the number of hot dogs the user wishes to broil at one time. Since baskets 3 have an identical shape and are interchangeable, the assembler simply selects the desired number. In the illustrated embodiment, rod 2 is specifically designed to mount two, three, or four baskets. The eyelets 9 on supports 24 at the open ends 7 of the selected baskets 4 are threaded over threads 10 onto the lower portion of rod 2, thereby non-fixedly retaining the upper ends of baskets 4 on rod 2. The inner nut 11 is then attached to the threaded end 10 of rod 2, and positioned at a rearward portion of the threaded end, such that the forward portion of the threaded rod end 10 is free. The eyelets 9 on the supports 25 at the closed ends of the selected baskets 6 are then threaded onto the forward portion of the threaded end 10 of rod 2. The second or outer nut 12 is an acorn nut, and is attached to the threaded terminal end of rod 2 at a position thereon forward of the wire support ends 25 assembled onto the rod. The selected baskets 6 assembled on rod 2 are then arranged into a regularly spaced apart configuration. In the example illustrated in FIG. 1, the four baskets 4 are arranged in a square pattern which is concentric with the axis of rod 2. In the example illustrated in FIG. 5, the three baskets 4a are arranged in a triangular configuration, having its center concentric with the axis of rod 2. When two baskets are used (not shown), they preferably extend from diametrically opposite sides of rod 2, so that broiler 1 is evenly balanced, and can be rotated smoothly. A fixture (not shown) may be used to properly space baskets 4, and retain the same in place during assembly. The outer, acorn nut 12 is then tightened against rod end 10, and the inner nut 11 is tightened against outer nut 12 in a double nut configuration, whereby support ends 25 on the selected baskets 6 are securely locked in place against each other in a sandwiched fashion, between nuts 11 and 12, thereby detachably connecting the selected baskets 6 with rod 2, and simultaneously retaining the baskets in the selected regularly spaced apart configuration. The helically shaped support ends 25 resiliently compress against each other when nuts 11 and 12 are tightened to securely lock baskets 4 in their radial position.

In use, the operator simply inserts elongate food articles into baskets 6 through the open ends 7 thereof, and holds the broiler 1 in a generally downwardly inclined orientation so that the food articles will not fall out. The user holds the basket end of broiler 1 over an open fire, or other similar source of heat, and slowly rotates handle 3 so that the baskets are evenly heated, and thoroughly and uniformly cook the food articles retained therein. Foreign material on baskets 6 can be easily removed simply by striking the basket with an object, thereby causing the basket to vibrate the encrusted material loose. Since the upper support ends 24 are non-fixedly attached to rod 2, and can slide longitudinally on rod 2, the spring-like baskets 6 can be flexed a substantial amount along the central axis of the coil for improved cleaning action.

Should the user need to replace a damaged basket, and/or change the number of baskets on the broiler, he simply disassembles baskets 6 by removing nuts 11 and 12 in the reverse order of steps described above.

In the foregoing description, it will be readily appreciated by those skilled in the art that modifications may be made to the invention without departing from the concepts disclosed herein. Such modifications are to be considered as included in the following claims, unless these claims by the language expressly state otherwise.

The embodiments of the invention in which an exclusive property or privilege is claimed are defined as follows:

1. In a method for making hot dog broilers and the like for open fire cooking, of the type including an elongate rod having a handle at one end, and a plurality of food retaining baskets attached to the other end of the rod, the improvement comprising:

forming the baskets with an identical shape, whereby the same are interchangeable, and each includes a closed end, and an open end through which food articles are inserted into the baskets;

attaching a laterally extending support wire to the open end and to the closed end of each of the baskets;

bending the free end of each support wire into an eyelet, shaped to closely receive the rod therethrough;

positioning the eyelet at the open and closed ends of each of the baskets in a mutually coaxial relationship;

forming threads in that end of the rod disposed opposite the handle;

selecting a predetermined number of the baskets;

threading the eyelets at the open ends of the selected baskets over the threaded end of the rod;

attaching a first nut to the threaded end of the rod, and positioning the first nut at a rearward portion of the threaded end, such that a forward portion of the threaded rod end is free;

threading the eyelets at the closed ends of the selected baskets onto the forward portion of the threaded end of the rod;

attaching a second nut to the threaded end of the rod at a position thereon forward of the closed end eyelets disposed on the rod;

arranging the selected baskets assembled on the rod into a regularly spaced apart configuration; and tightening the second nut against the first nut, whereby each eyelet is securely locked in place against each other in a sandwiched fashion between the nuts, thereby detachably connecting the selected baskets with the rod, and retaining the baskets in the regularly spaced apart configuration.

2. A method as set forth in claim 1, including:

bending the free end of each support wire into a helical configuration, and forming a sharp terminal edge thereon, whereby the free ends of the support wires are self-locking when sandwiched together.

3. A method as set forth in claim 2, wherein:

said support wire attaching step comprises forming the support wires integral with said baskets.

4. A method as set forth in claim 3, wherein:

said eyelets are formed to a diameter slightly larger than the diameter of the rod, such that the support wires at the open ends of the baskets can slide longitudinally on the rod when assembled, to provide easy detachment for repair, and permit improved vibration of the baskets when struck to remove foreign material from the baskets.

5. A method as set forth in claim 1, wherein:

said support wire attaching step comprises forming the support wires integral with said baskets.

6. A method as set forth in claim 1, wherein:

said eyelets are formed to a diameter slightly larger than the diameter of the rod, such that the support wires at the open ends of the baskets can slide longitudinally on the rod when assembled, to provide easy detachment for repair and permit improved vibration of the baskets when struck to remove foreign material from the baskets.

7. A broiler for hot dogs and the like, constructed in accordance with the method set forth in claim 1.

8. An apparatus for broiling hot dogs and the like over an open fire, comprising:

an elongate, rigid, rod having a handle attached to one end thereof, and threads formed on the other end of said rod;

a plurality of baskets shaped to retain hot dogs therein; each of said baskets including a closed end, and an open end through which the hot dogs are inserted into said baskets; said baskets having an identical shape, whereby the same are interchangeable; each of said baskets having a support wire extending laterally from the closed end and the open end thereof for connecting said baskets to said rod; each support wire having a bent over free end which forms an eyelet shaped to receive said rod closely therethrough; each wire support eyelet disposed at the open end of said baskets being threaded over said threads, onto the other end of said rod for non-fixedly connecting the open ends of said baskets with said rod; and each wire support eyelet disposed at the closed end of said baskets being positioned on said threads in a side-by-side relationship; and a pair of threaded nuts connected with the threaded end of said rod on opposite sides of the closed end eyelets assembled thereon, and being tightened thereagainst, whereby said closed end eyelets are securely locked in place against each other in a sandwiched fashion between said nuts, thereby fixedly connecting the closed ends of said baskets with said rod.

9. An apparatus as set forth in claim 8, wherein:

said bent over free ends have a helical shape, and a sharp terminal edge, whereby the free ends of said support wires are self-locking when sandwiched between said nuts.

* * * * *